Aug. 10, 1937.   T. J. SWINNEY   2,089,771
INDUCTION SYSTEM OF INTERNAL COMBUSTION ENGINES
Filed July 21, 1936
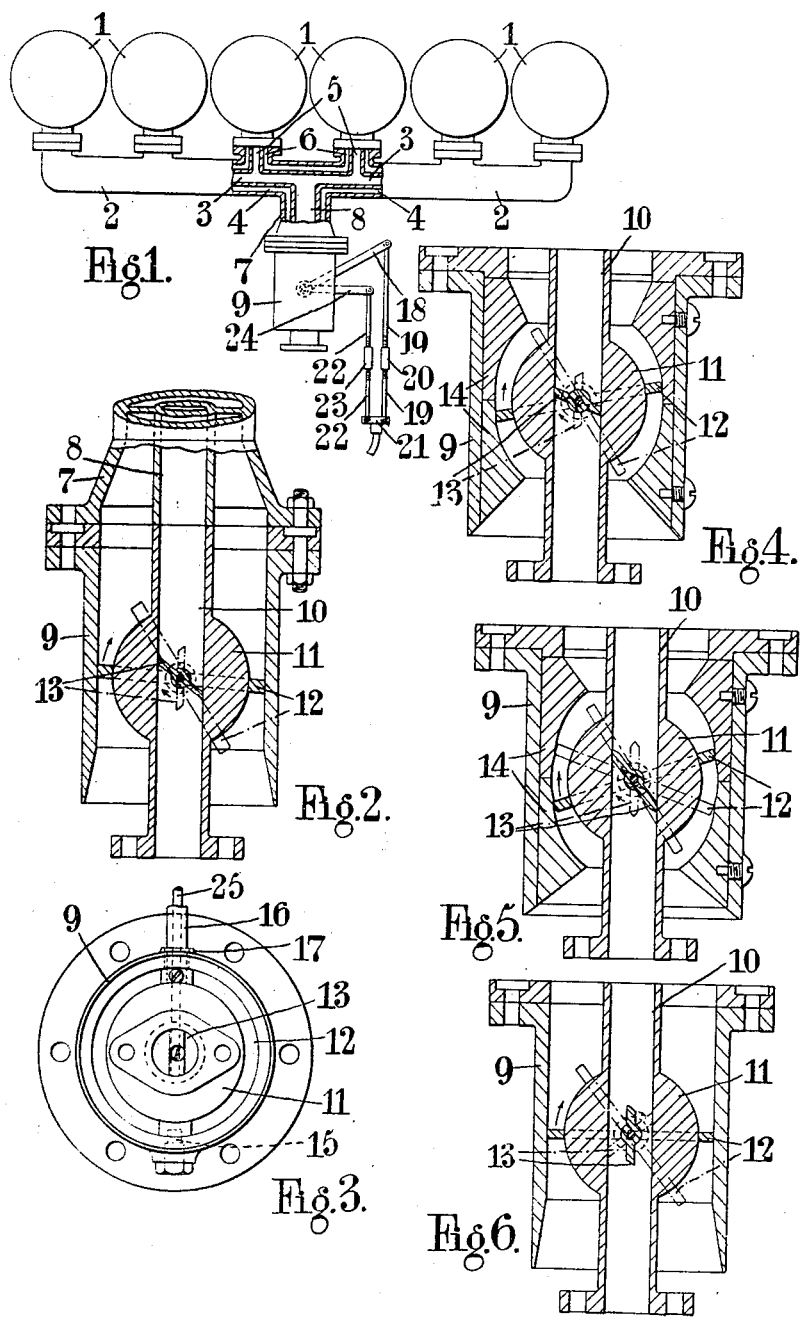

Patented Aug. 10, 1937

2,089,771

UNITED STATES PATENT OFFICE 2,089,771

INDUCTION SYSTEM OF INTERNAL COMBUSTION ENGINES

Thomas James Swinney, London, England

Application July 21, 1936, Serial No. 91,777
In Great Britain July 26, 1935

12 Claims. (Cl. 123—127)

This invention relates to induction systems of internal combustion engines.

The expression "induction systems" as used herein includes, broadly, that portion of an internal combustion engine installation by which air or a mixture of fuel and air is supplied to the cylinders of the engine and thus includes what are known as carburetors.

The object of the invention generally stated is to provide improvements in the induction system of internal combustion engines, as above defined, and in particular in the direction of securing that, at varying speeds of running or in the operating conditions of the engine, fuel and air is delivered to the engine cylinders in appropriate relative proportions.

The general practice in connection with the arrangement of the induction systems of internal combustion engines operating on relatively volatile fuels is to employ a carburetor having a main passage through which a mixture of fuel and air will travel into the cylinders during normal running and to provide a by-pass jet usually called the slow running jet by which a relatively rich mixture is supplied to the passage leading from the carburetor to the engine cylinders and in advance or engine side of the throttle located in the passage.

It has, however, been proposed in connection with induction systems of internal combustion engines to employ two carburetors each connected with an induction pipe furnished with a throttle, the two throttles being interconnected in such manner that the idle running air inlet of the main carburetor is controlled in dependence on the operation of the auxiliary carburetor.

Above, reference has been made to carburetors which may be regarded as being devices for securing the vaporization, sub-division or dispersion in air of a stream of relatively volatile fuel.

The invention is, however, not restricted to arrangements designed to be employed with relatively volatile fuel and it extends to arrangement primarily for use with fuels of lower volatility than what is known as petrol, and includes arrangements for the supply of air to Diesel or other heavy oil engines.

The invention consists, broadly, in an induction system in which there are provided two passages for the supply of working fluid to the engine and in which movable valve elements controlling the flow in such passages are arranged to be rotated about the same or a common axis.

At this point it may be mentioned that where the invention is applied in connection with Diesel engines one of the passages may supply hot air and the other cold air to the engine and the throttles associated with the passages will be arranged to vary the proportions of cold and hot air supplied. Thus, for example, the throttles may be arranged so that when that functioning to control the supply of hot air is completely closed, the area of the passage for the flow of cold air will be sufficient to supply the quantity needed at full load.

Preferably, in accordance with the invention, the two passages are arranged coaxially.

Conveniently adjacent to the position where the movable valve elements control the flow of working fluid through the outer passage, the form thereof is such that when the valves associated with the passages are in the open position, flow throughout substantially the whole of the space between the inner and the outer passage is secured.

Thus, in accordance with the invention, the inner and outer passages may be constituted by concentrically arranged tubes the inner of which is furnished externally with a spherical enlargement and on the diameter of the enlargement at right angles to the common axis of the two passages there is rotatably arranged an annulus constituting the throttle for the outer passage while, on the same diameter, the means for regulating the flow through the inner passage is arranged.

For instance, with such a construction, through the walls of the outer and inner passage and diametrically through the enlargement on the external surfaces of the inner passage there may be arranged to extend a spindle on which is mounted the annular member forming the throttle for the outer passage and the member functioning as a throttle for the inner passage.

The relative positions of the throttles with respect to the closing of the passages may be varied in accordance with the particular requirements, so as to ensure that they are arranged to operate in a desired out-of-step relation.

This relation may be fixed in assembling the device or it may be arranged to be readily adjusted either during running or otherwise as occasion may require.

In all cases the relation of the throttle associated with the outer passage will be such that the inner passage may be slightly open when the outer passage is substantially or completely closed.

The inner surface of the outer passage may immediately in the vicinity of the throttle be spherical in shape or it may be of any other form adapted to secure a desired variation in area of the passage permitting the flow of gas in accordance with the variation of the position of the throttle, for example it may comprise an internal spherical portion and further on one or both sides of the throttle there may be located portions having converging walls so as to form a converging, diverging passage generally of the character of a Venturi passage.

The throttle for the inner passage may be of the disc or butterfly type, or it may be of barrel formation.

For instance, it may be an externally spherically surfaced member or a cylindrical member through which a passage extends adapted to be brought into or out of register with the adjacent portions of the inner passage and thus resembling in effect a stop-cock, the portion of the passage within which it is located being of a corresponding form.

While the constructions above described are preferred constructions, the invention extends also to constructions or arrangements in which the valve elements are of a form other than the valves or throttles described above.

Thus a device or arrangement in accordance with the invention may comprise a generally cylindrical element arranged with its axis at right angles with the common axes of the inner and outer passages and at convenient points furnished with apertures registering with the passages and containing a rotatable valve body similarly furnished with apertures adapted to be brought into the first-mentioned apertures at appropriate times in order to secure a regulation of the flow of air or air and fuel through the outer and inner passages.

Normally, in accordance with the invention, the inner passage will be provided with extensions opening into or adjacent to the cylinder head, and conveniently into auxiliary valve chambers or in the vicinity of valves whereby the mixture flowing therethrough may be admitted to the engine cylinders while the outer passage is similarly arranged to extend to the cylinder heads, the admission of air therefrom to the cylinder heads being controlled by additional valves. In this way a degree of what is known as stratification of the mixture delivered to the engine cylinders may be secured.

Where, as is usual, the device or arrangement in accordance with the invention comprises inner and outer passages within the space between the walls of such passages there may be provided webs adapted to sub-divide the flow of fluid through the outer passage and these webs may be arranged to extend throughout the length of the passage or may be located merely at certain portions thereof and, optionally, they may be of a form to permit turbulent flow. Thus, for instance, they may be of spiral or helical formation.

The invention extends to means which may be interposed between the carburetor and the engine in the induction system thereof and to a carburetor comprising means of the character defined as an integral part thereof or as an attachment or supplement.

Numerous advantages may be secured by the invention in addition to those generally above indicated.

For instance, in accordance with the invention, at varying speeds of operation of the engine, or under varying load conditions, a speed of travel of air adapted to secure the supply of fuel at the desired rate, will be obtained through one passage which will normally be the smaller of the passages and be located within an outer passage while the necessary quantity of additional air is supplied by way of the other passage.

The arrangement of the two passages one within the other, the inner being the passage which primarily is effected in leading fuel to the engine cylinder, will be of advantage also in many cases in that the heat taken up by the vaporization of the fuel will be abstracted from the air passing through the outer passage and not from the external air, and this will operate in the direction of securing an adequate supply of air to the engine cylinders under widely varying conditions of operation, and particularly under conditions which are unfavourable, as for instance in the case of aeroplane engines operating at considerable elevations; for the cooling effect obtained will in such case act in the direction of overcoming the inconveniences arising from the attenuation of the air.

The invention will be described further in detail and by way of example with reference to the accompanying drawing, in which:—

Figure 1 illustrates in plan view an induction system of a six cylinder engine.

Figure 2 is a sectional view on an enlarged scale of the portion of the system comprising the valve elements, Figure 3 being a view in end elevation thereof, Figures 4 and 5 are views in section of the portion of the induction system comprising valve elements adapted to be associated with, for instance, aircraft engines, Fig. 6 is a similar view illustrating the application of the invention to Diesel engines.

Referring to Figure 1, to the cylinders 1 is secured a manifold 2 in which are provided a main inner passage 3 and a main outer passage 4 from which extend respectively branches 5 and 6 to each of the cylinders. These branches may open into a common inlet valve chamber associated with the respective cylinder or with separate inlet valve chambers associated with each cylinder.

The manifold is connected by the branch 7 within which is an inner passage 8 with a conduit 9 enclosing movable valve elements adapted to control the flow of fluid through the passages 3 and 4.

In the conduit 9 there is provided a centrally disposed conduit 10 registering with the inner passage 8 in the branch 7 and on this conduit there is formed a generally spherically surfaced portion 11, about which is engaged an annular valve element 12, while within the conduit 10 there is arranged a second movable valve element 13.

In the case of the construction illustrated in Figure 2 the internal surface of the conduit 9 is cylindrical whereas in the case of the construction illustrated in Figure 4 within the conduit there is arranged a member 14 which in effect is a choke tube this member being formed in two halves and a similar member is provided in the construction shown in Figure 5, the form of the choke tubes in the two cases being, however, somewhat different.

In the case of Figure 6, a choke tube is not provided and the difference between the construction shown in this figure and that shown in Figure 2 is simply in respect of the relative positions of the two valve elements 11 and 12.

The annular valve element 12 is pivoted, as shown in Figure 3, at one point on a pin bearing 15 and it is furnished at a diametrically opposite point with a sleeve 16 passing through a bearing 17 the sleeve being connected with, for instance, a lever 18 as shown in Figure 1 which is connected through the member 19 furnished with a turnbuckle 20 with the common control element 21 which is connected through the link 22 furnished with a turnbuckle 23 with the lever 24 connected to the spindle 25 of the inner valve element 13 so that motion may be simultaneously imparted to both of the valves.

I claim:

1. An induction system for internal combustion engines comprising two concentrically arranged tubes providing passages for the supply of working fluid to the engine, and for controlling the flow of fluid through the said passages valve elements mounted in the said passages for rotation about a common axis extending tranversely to the common axis of the concentric passages.

2. An induction system for internal combustion engines comprising two concentrically arranged tubes providing passages for the supply of working fluid to the engine, a spherical enlargement on the outer surface of the inner tube, an annular movable valve element mounted for rotation on the said enlargement about an axis extending at right angles to the common axis of the two tubes and including a diameter of the enlargement, and a further movable valve element mounted for rotation about the said axis within the inner tube.

3. An induction system for internal combustion engines comprising two concentrically arranged tubes providing passages for the supply of working fluid to the engine, a spherical enlargement on the outer surface of the inner tube, a rotatable spindle extending through the walls of the outer tube and through the spherical enlargement along an axis including a diameter of the spherical enlargement which is at right angles to the common axis of the tubes, an annular movable valve element rotatably mounted upon the spherical enlargement and secured to the spindle, and a further movable valve element rotatably mounted within the inner tube and also secured to the spindle.

4. An induction system for internal combustion engines comprising two concentrically arranged tubes providing passages for the supply of working fluid to the engine, a spherical enlargement on the outer surface of the inner tube, a rotatable spindle extending through the walls of the outer tube and through the spherical enlargement, an annular movable valve element rotatably mounted upon the spherical enlargement and secured to the spindle, and a further movable valve element rotatably mounted within the inner tube and also secured to the spindle.

5. An induction system for internal combustion engines comprising two concentrically arranged tubes providing passages for the supply of working fluid to the engine, a rotatable spindle extending through both of the said tubes, and for simultaneously controlling the flow of fluid through both of the said tubes a movable valve element secured to the spindle in the outer tube and a further movable valve element secured to the spindle in the inner tube.

6. An induction system for internal combustion engines comprising two concentrically arranged tubes providing passages for the supply of working fluid to the engine, a spherical enlargement on the outer surface of the inner tube, an annular movable valve element mounted for rotation on the said enlargement about an axis extending at right angles to the common axis of the two tubes and including a diameter of the enlargement, curved surfaces on the inner surface of the outer tube for securing a desired variation in area of the outer passage permitting the flow of fluid therethrough in accordance with variation in the position of the annular movable valve element, and a further movable valve element mounted for rotation about the said axis within the inner tube.

7. An induction system for internal combustion engines comprising two concentrically arranged tubes providing passages for the supply of working fluid to the engine, a spherical enlargement on the outer surface of the inner tube, a rotatable spindle extending through the walls of the outer tube and through the spherical enlargement along an axis including a diameter of the spherical enlargement which is at right angles to the common axis of the tubes, an annular movable valve element rotatably mounted upon the spherical enlargement and secured to the spindle, curved surfaces on the inner surface of the outer tube for securing a desired variation in area of the outer passage permitting the flow of fluid therethrough in accordance with variations in the position of the annular movable valve element, and a further movable valve element rotatably mounted within the inner tube and also secured to the spindle.

8. An induction system for internal combustion engines comprising two concentrically arranged tubes providing passages for the supply of working fluid to the engine, a spherical enlargement on the outer surface of the inner tube, a rotatable spindle extending through the walls of the outer tube and through the spherical enlargement, an annular movable valve element rotatably mounted upon the spherical enlargement and secured to the spindle, curved surfaces on the inner surface of the outer tube for securing a desired variation in area of the outer passage permitting the flow of fluid therethrough in accordance with variations in the position of the annular movable valve element, and a further movable valve element rotatably mounted within the inner tube and also secured to the spindle.

9. An induction system for internal combustion engines comprising two concentrically arranged tubes providing passages for the supply of working fluid to the engine, a rotatable spindle extending through both of the said tubes, for simultaneously controlling the flow of fluid through both of the said tubes a movable valve element secured to the spindle in the outer tube and a further movable valve element secured to the spindle in the inner tube, portions on the inner surface of the outer tube diverging from one side of the movable valve elements, and further portions on the inner surface of the outer tube diverging from the other side of the movable valve elements and providing with the first mentioned diverging portions a converging diverging passage of generally Venturi form.

10. An induction system for internal combustion engines comprising two concentrically arranged tubes providing passages for the supply of working fluid to the engine, a spherical enlargement on the outer surface of the inner tube, an annular movable valve element mounted for rotation on the said enlargement about an axis extending at right angles to the common axis of the two tubes and including a diameter of the enlargement, curved surfaces on the inner surface of the outer tube for securing a desired variation in area of the outer passage permitting the flow of fluid therethrough in accordance with variation in the position of the annular movable valve element, a further movable valve element mounted for rotation about the said axis within the inner tube, portions on the inner surface of the outer tube diverging from one side of the movable valve elements, and further portions on the inner surface of the outer tube diverging from the other side of the movable valve elements and providing with the first mentioned diverging portions a converging diverging passage of generally Venturi form.

11. An induction system for internal combustion engines comprising two concentrically arranged tubes providing passages for the supply of working fluid to the engine, a spherical enlargement on the outer surface of the inner tube, a rotatable spindle extending through the walls of the outer tube and through the spherical enlargement along an axis including a diameter of the spherical enlargement which is at right angles to the common axis of the tubes, an annular movable valve element rotatably mounted upon the spherical enlargement and secured to the spindle, curved surfaces on the inner surface of the outer tube for securing a desired variation in area of the outer passage permitting the flow of fluid therethrough in accordance with variations in the position of the annular movable valve element, a further movable valve element rotatably mounted within the inner tube and also secured to the spindle, portions on the inner surface of the outer tube diverging from one side of the movable valve elements, and further portions on the inner surface of the outer tube diverging from the other side of the movable valve elements and providing with the first mentioned diverging portions a converging diverging passage of generally Venturi form.

12. An induction system for internal combustion engines comprising two concentrically arranged tubes providing passages for the supply of working fluid to the engine, a spherical enlargement on the outer surface of the inner tube, a rotatable spindle extending through the walls of the outer tube and through the spherical enlargement, an annular movable valve element rotatably mounted upon the spherical enlargement and secured to the spindle, curved surfaces on the inner surface of the outer tube for securing a desired variation in area of the outer passage permitting the flow of fluid therethrough in accordance with variations in the position of the annular movable valve element, a further movable valve element rotatably mounted within the inner tube and also secured to the spindle, portions on the inner surface of the outer tube diverging from one side of the movable valve elements, and further portions on the inner surface of the outer tube diverging from the other side of the movable valve elements and providing with the first mentioned diverging portions a converging diverging passage of generally Venturi form.

THOMAS JAMES SWINNEY.